United States Patent
Chou et al.

(10) Patent No.: US 10,051,173 B2
(45) Date of Patent: Aug. 14, 2018

(54) IMAGE PICK-UP APPARATUS AND PROGRESSIVE AUTO-FOCUS METHOD THEREOF

(71) Applicant: Altek Semiconductor Corp., Hsinchu (TW)

(72) Inventors: Hong-Long Chou, Hsinchu (TW); Chung-Ta Wu, Hsinchu (TW); Yen-Chi Wang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 49 days.

(21) Appl. No.: 15/284,553

(22) Filed: Oct. 4, 2016

(65) Prior Publication Data
US 2017/0347013 A1 Nov. 30, 2017

Related U.S. Application Data (60) Provisional application No. 62/341,102, filed on May 25, 2016.

(30) Foreign Application Priority Data

Aug. 11, 2016 (TW) .............................. 105125541 A (51) Int. Cl.
*H04N 5/232* (2006.01)
*H04N 5/351* (2011.01)
(Continued)

(52) U.S. Cl.
CPC ......... *H04N 5/23212* (2013.01); *H04N 5/351* (2013.01); *H04N 5/3696* (2013.01); *H04N 5/376* (2013.01)

(58) Field of Classification Search
CPC .... H04N 5/23212; H04N 5/376; H04N 5/351; H04N 5/3696
See application file for complete search history.

(56) References Cited

U.S. PATENT DOCUMENTS

| | | | | |
|---|---|---|---|---|
| 8,218,061 B2* | 7/2012 | Baxansky | .......... | H04N 5/23212 348/345 |
| 8,849,064 B2* | 9/2014 | Mocanu | .................. | G06T 5/003 348/333.12 |
| 2016/0080633 A1* | 3/2016 | Hong | ................. | H04N 5/23212 348/169 |

FOREIGN PATENT DOCUMENTS

CN          102158648          8/2011

OTHER PUBLICATIONS

"Office Action of Taiwan Counterpart Application," dated Jan. 24, 2017, p. 1-p. 4.

* cited by examiner

*Primary Examiner* — Padma Haliyur
(74) *Attorney, Agent, or Firm* — JCIPRNET (57) ABSTRACT

An image pick-up apparatus and a progressive auto-focus method thereof are provided. The image pick-up apparatus includes an optical system, an image sensor, a focus circuit and a lens control circuit. In the method, an image is captured by using the image sensor and whether the optical system is in focus when the image sensor captures the image is determined by the focus circuit. If the optical system is out of focus, an in-focus location of the optical system and an in-focus distance for moving the optical system to the in-focus location are calculated by the focus circuit. The in-focus distance is transformed into a shorter progressive distance and the optical system is controlled by the lens control circuit to move by the progressive distance. Aforesaid steps are repeated until the optical system is in focus and the image captured by the image sensor is output.

16 Claims, 5 Drawing Sheets

(51) Int. Cl.
*H04N 5/369* (2011.01)
*H04N 5/376* (2011.01)

IMAGE PICK-UP APPARATUS AND PROGRESSIVE AUTO-FOCUS METHOD THEREOF

CROSS-REFERENCE TO RELATED APPLICATION

This application claims the priority benefit of U.S. provisional application Ser. No. 62/341,102, filed on May 25, 2016, and Taiwan application serial no. 105125541, filed on Aug. 11, 2016. The entirety of each of the above-mentioned patent applications is hereby incorporated by reference herein and made a part of this specification.

BACKGROUND OF THE INVENTION

Field of the Invention

The invention relates to an apparatus and a method for image pick-up, and particularly relates to an image pick-up apparatus and a progressive auto-focus method thereof.

Description of Related Art

Along with progress of image pick-up technology, the number of pixels of digital cameras is greatly increased, though a camera size is relatively decreased, so that the digital cameras can be equipped on portable electronic devices such as mobile phones, or tablet personal computers, to facilitate users capturing images anytime and anywhere. To facilitate the user quickly capturing a clear image, the camera on the portable electronic device generally has an auto focus (AF) function, which is adapted to actively detect an object within a range of a camera field of view and automatically move a lens to focus on the object when the user activates the camera. In this way, a time spent on manual focus is saved.

The auto focus technique refers to a technique that the camera moves the lens to change a focal length thereof. During a process of the auto focus, the lens is continually moved until a maximum focus value is reached. Under the maximum focus value, a focal point of the lens of the camera accurately falls on the object to be photographed, such that the camera may capture a clear image of the object.

Figure 1:
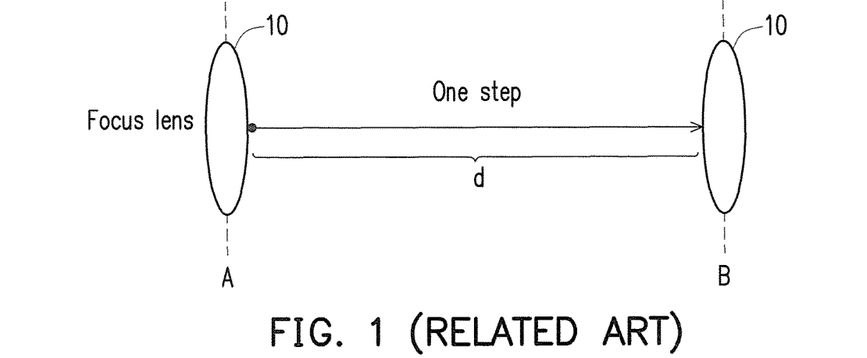
FIG. 1 is a schematic diagram of a focus method of a conventional camera.

In order to save a focus time, after an in-focus location of the object to be photographed is calculated, the camera pushes the lens to the in-focus location all at once. As shown in FIG. 1, FIG. 1 is a schematic diagram of a focus method of a conventional camera. The conventional camera, for example, implements focus by adopting a phase detection auto-focus (PDAF) method or an infrared ranging method, where a focus lens 10 of the camera is originally located at a defocus location A, and when the camera calculates an in-focus location B of the focus lens 10, the camera moves the focus lens 10 to the in-focus location B all at once (by a distance d), so as to quickly complete a focus operation.

However, if the object to be photographed moves during the focus process, the in-focus location of the camera lens is accordingly moved. Even if the object to be photographed is not moved, the in-focus location calculated by the camera may probably be inaccurate due to the influence of environment factors (for example, light is too dark). Therefore, the aforementioned method of moving the lens all in once probably results in a fact that the lens is moved too much or too little, and the lens is required to be moved back and forth, so that the focus time of the camera is prolonged, and the suddenly clear and suddenly blurred image displayed during the focus process may influence a photographing experience of the user.

SUMMARY OF THE INVENTION

The invention is directed to an image pick-up apparatus and a progressive auto-focus method thereof, by which a focus speed of a camera is accelerated through the progressive auto-focus method, so as to provide a good photographing experience to a user.

The invention provides a progressive auto-focus method of an image pick-up apparatus, where the image pick-up apparatus includes an optical system, an image sensor, a focus circuit and a lens control circuit. In the method, an image is captured by using the image sensor, and whether the optical system is in focus when the image sensor captures the image is determined by the focus circuit. If the optical system is out of focus, an in-focus location of the optical system and an in-focus distance for moving the optical system to the in-focus location are calculated by the focus circuit. The in-focus distance is transformed into a progressive distance by the lens control circuit, and the optical system is controlled by the lens control circuit to move by the progressive distance, where the progressive distance is smaller than the in-focus distance. Then, the aforementioned steps are repeated until the optical system is in focus and the image captured by the image sensor is output.

In an embodiment of the invention, the image sensor includes a plurality pairs of focus detection pixels, and the focus circuit includes a phase detection circuit, and the step of calculating the in-focus location of the optical system and the in-focus distance for moving the optical system to the in-focus location by the focus circuit includes receiving a plurality of image signals captured by the focus detection pixels when the image sensor captures the image by the phase detection circuit, and calculating a phase difference between the image signals captured by each pair of the focus detection pixels by the phase detection circuit, and calculating the in-focus location of the optical system and the in-focus distance for moving the optical system to the in-focus location according to the calculated phase difference.

In an embodiment of the invention, the step of determining whether the optical system is in focus when the image sensor captures the image by the focus circuit includes determining whether the optical system is in focus when the image sensor captures the image by the phase detection circuit based on the calculated phase difference.

In an embodiment of the invention, the progressive auto-focus method further includes detecting a moving object in the image by the phase detection circuit based on the calculated phase difference, and calculating a prediction location of the moving object after movement, and calculating a distance for moving the optical system to the prediction location to serve as the in-focus distance by the phase detection circuit if the moving object is detected.

In an embodiment of the invention, the image pick-up apparatus further includes an image processing circuit, and the progressive auto-focus method further includes analysing the image captured by the image sensor by the image processing circuit to detect a moving object in the image, and calculating a prediction location of the moving object after movement, and calculating a distance for moving the optical system to the prediction location to serve as the in-focus distance by the image processing circuit if the moving object is detected.

In an embodiment of the invention, the step of transforming the in-focus distance into the progressive distance by the lens control circuit includes inquiring a transform table by the lens control circuit to transform the in-focus distance into the progressive distance, where in the transform table, the in-focus distance is divided into a plurality of segments according to a value range, and the progressive distance corresponding to each of the segments is preset.

In an embodiment of the invention, the image pick-up apparatus further includes an image processing circuit, and the progressive auto-focus method further includes analysing the image captured by the image sensor by the image processing circuit to generate a confidence value, and adjusting the progressive distance corresponding to each of the segments in the transform table according to the confidence value.

In an embodiment of the invention, the image pick-up apparatus further includes an image processing circuit, and the progressive auto-focus method further includes analysing the image captured by the image sensor by the image processing circuit to generate a confidence value, and transforming the in-focus distance into the progressive distance by the lens control circuit according to the confidence value.

In an embodiment of the invention, after the step of calculating the in-focus location of the optical system and the in-focus distance for moving the optical system to the in-focus location by the focus circuit, the progressive auto-focus method further includes determining whether the in-focus distance is smaller than or equal to a predetermined minimum distance by the focus circuit, where if the in-focus distance is not smaller than or equal to the predetermined minimum distance, the lens control circuit transforms the in-focus distance into the progressive distance, and the lens control circuit controls the optical system to move by the progressive distance; and if the in-focus distance is smaller than or equal to the predetermined minimum distance, the lens control circuit directly controls the optical system to move by the progressive distance.

The invention provides an image pick-up apparatus including an optical system, an image sensor, a focus circuit and a lens control circuit. The image sensor is configured to capture an image. The focus circuit is configured to determine whether the optical system is in focus when the image sensor captures the image, and calculate an in-focus location of the optical system and an in-focus distance for moving the optical system to the in-focus location when the optical system is out of focus. The lens control circuit is configured to transform the in-focus distance into a progressive distance, and control the optical system to move by the progressive distance, where the progressive distance is smaller than the in-focus distance. When the focus circuit determines that the optical system is in focus, the focus circuit outputs the image captured by the image sensor.

In an embodiment of the invention, the image sensor includes a plurality pairs of focus detection pixels, and the focus circuit includes a phase detection circuit configured to receive a plurality of image signals captured by the focus detection pixels when the image sensor captures the image, and calculate a phase difference between the image signals captured by each pair of the focus detection pixels, and calculate the in-focus location of the optical system and the in-focus distance for moving the optical system to the in-focus location according to the calculated phase difference.

In an embodiment of the invention, the phase detection circuit determines whether the optical system is in focus when the image sensor captures the image based on the calculated phase difference.

In an embodiment of the invention, the phase detection circuit detects a moving object in the image based on the calculated phase difference, and calculates a prediction location of the moving object after movement when the moving object is detected, and calculates a distance for moving the optical system to the prediction location to serve as the in-focus distance.

In an embodiment of the invention, the image pick-up apparatus further includes an image processing circuit configured to analyse the image captured by the image sensor to detect a moving object in the image, and calculate a prediction location of the moving object after movement when the moving object is detected, and calculate a distance for moving the optical system to the prediction location to serve as the in-focus distance.

In an embodiment of the invention, the lens control circuit inquires a transform table to transform the in-focus distance into the progressive distance, where in the transform table, the in-focus distance is divided into a plurality of segments according to a value range, and the progressive distances corresponding to each of the segments are preset.

In an embodiment of the invention, the image pick-up apparatus further includes an image processing circuit configured to analyse the image captured by the image sensor to generate a confidence value, and adjust the progressive distance corresponding to each of the segments in the transform table according to the confidence value.

In an embodiment of the invention, the image pick-up apparatus further includes an image processing circuit configured to analyse the image captured by the image sensor to generate a confidence value, where the lens control circuit transforms the in-focus distance into the progressive distance according to the confidence value.

In an embodiment of the invention, the lens control circuit further determines whether the in-focus distance calculated by the focus circuit is smaller than or equal to a predetermined minimum distance, and transforms the in-focus distance into the progressive distance when the in-focus distance is not smaller than or equal to the predetermined minimum distance, and controls the optical system to move by the progressive distance; and otherwise, the lens control circuit directly controls the optical system to move by the in-focus distance.

According to the above description, in the image pick-up apparatus and the progressive auto-focus method thereof, while the camera captures the image, the in-focus location of the lens of the camera is calculated, and after the in-focus distance for moving the lens is calculated, the in-focus distance is properly transformed into a shorter progressive distance for moving the lens. If the moving object is detected, the progressive distance is calculated according to the position of the moving object after the movement. In this way, delay of the focus speed due to back and forth movement of the lens is avoided, so as to provide good photographing experience to the user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the invention, a progressive auto-focus method for moving a lens by multiple times is used to replace the conventional all-at-once movement focus method to move the lens to an in-focus location. After an in-focus distance for moving the lens to the in-focus location is calculated, the in-focus distance is transformed into a shorter progressive distance according to a predetermined transform table or according to a confidence value obtained by evaluating a captured image for moving a focus lens. In the invention, the focus lens is progressively moved to the in-focus location in a progressive manner, by which not only stability of the image captured during the focus process is maintained, a breath phenomenon caused by moving the lens back and forth is avoided.

Figure 2:
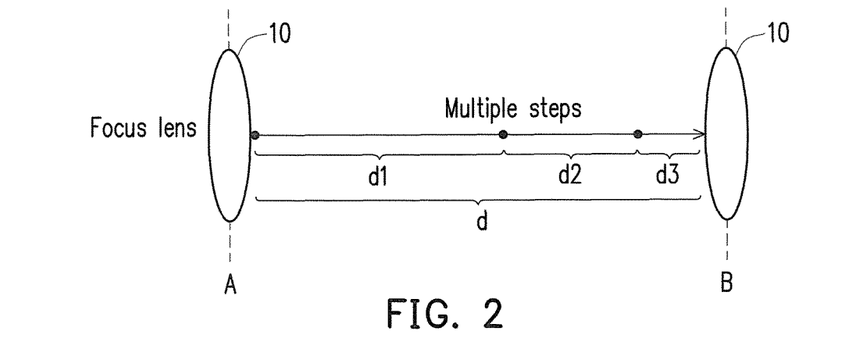
FIG. 2 is a schematic diagram of a progressive auto-focus method of an image pick-up apparatus according to an embodiment of the invention.

FIG. 2 is a schematic diagram of a progressive auto-focus method of an image pick-up apparatus according to an embodiment of the invention. Referring to FIG. 1 and FIG. 2, a focus lens 10 of the present embodiment is originally located at a defocus location A, and after the camera calculates an in-focus location B of the focus lens 10, the camera pushes the focus lens 10 step by step from the defocus location A to the in-focus location B (in the present embodiment, the camera pushes the focus lens 10 by three steps, and distances thereof are respectively d1, d2, d3, though the invention is not limited thereto), so as to avoid moving the lens back and forth to slow down a focus speed. It should be noted that the aforementioned progressive distances d1, d2, d3 are not obtained by directly dividing the in-focus distance d, but each time after the camera moves the focus lens by a certain distance, the camera recalculates the in-focus distance and transform the same into the progressive distance. In this way, the in-focus distance inaccurately calculated due to movement of the photographed object or influence of environment factors can be avoided.

Figure 3:
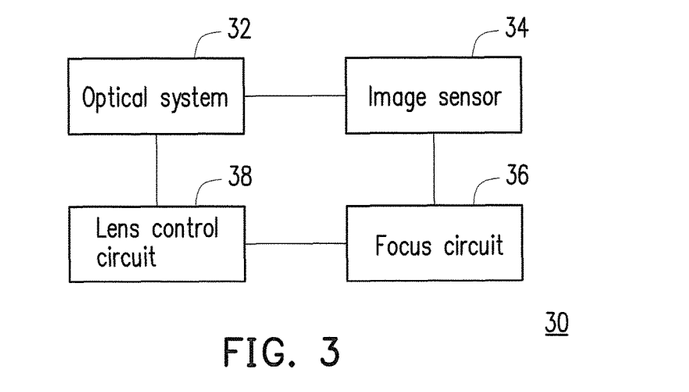
FIG. 3 is a block diagram of an image pick-up apparatus according to an embodiment of the invention.

FIG. 3 is a block diagram of an image pick-up apparatus according to an embodiment of the invention. Referring to FIG. 3, the image pick-up apparatus 30 of the present embodiment is, for example, a digital camera, a digital video camcorder (DVC), or a camera equipped on an electronic device such as a mobile phone, a tablet personal computer, a notebook computer, a navigation device, or a driving recorder, which is adapted to provide a camera function. The image pick-up apparatus 30 includes an optical system 32, an image sensor 34, a focus circuit 36 and a lens control circuit 38, and functions thereof are respectively described below.

The optical system 32 includes a lens, an actuator, an aperture and a shutter, etc., where the lens is composed of a plurality of concave-convex lenses driven by actuators such as step motors or voice coil motors (VCM), such that relative positions between the concave-convex lenses can be changed to change a focal length of the lens. The aperture is disposed in the lens, and the aperture is a ring-shaped opening composed of a plurality of metal blades, and the opening can be enlarged or shrunk along with a magnitude of an aperture value, so as to control an amount of light entering the lens. The shutter is configured to control a time length that the light enters the lens, and a combination of the shutter and the aperture may influence an exposure amount of the image captured by the image sensor 34.

The image sensor 34 is coupled to the optical system 32, and the image sensor 34 is configured with a charge coupled device (CCD), a complementary metal-oxide semiconductor (CMOS) device or other types of photosensitive device capable of sensing an intensity of light entering the optical system 32 to produce an image.

The focus circuit 36 is, for example, implemented by an integrated circuit (IC), and the focus circuit 36 may determine whether the optical system 32 is in focus when the image sensor 34 captures the image, and may calculate an in-focus location of the optical system 32 and an in-focus distance for moving the optical system 32 to the in-focus location.

It should be noted that in an embodiment, pixels in the image sensor 34 include image capturing pixels and focus detection pixels, where the image capturing pixels may provide color image signals used for generating images, and the focus detection pixels may be distributed between the image capturing pixels in pairs and adapted to provide image signals used for detecting a phase difference. The focus circuit 36 is, for example, a phase detection circuit, which may receive the image signals captured by the focus detection pixels when the image sensor 34 captures the image and calculate a phase difference between the image signals captured by each pair of the focus detection pixels, so as to determine whether the optical system 32 is in focus when the image sensor 34 captures the image. If the image signals detected by the focus detection pixels are matched to each other, it is determined that the optical system is in focus; conversely, if the image signals detected by the focus detection pixels have a phase difference, it is determined that the optical system is out of focus. Moreover, the phase detection circuit may further calculate the in-focus location of the optical system 32 and the in-focus distance for moving the optical system 32 to the in-focus location based on the calculated phase difference.

The lens control circuit 38 is, for example, implemented by a microprocessor, a digital signal processor, a programmable controller, an application specific integrated circuit or other similar device, and is configured to control the actuator in the optical system 32 to drive the lens to change a focal length thereof. In the present embodiment, the lens control circuit 38 further receives the in-focus distance calculated by the focus circuit 36, and transforms the in-focus distance into the progressive distance, so as to control the optical system 32 to move the lens.

Figure 4:
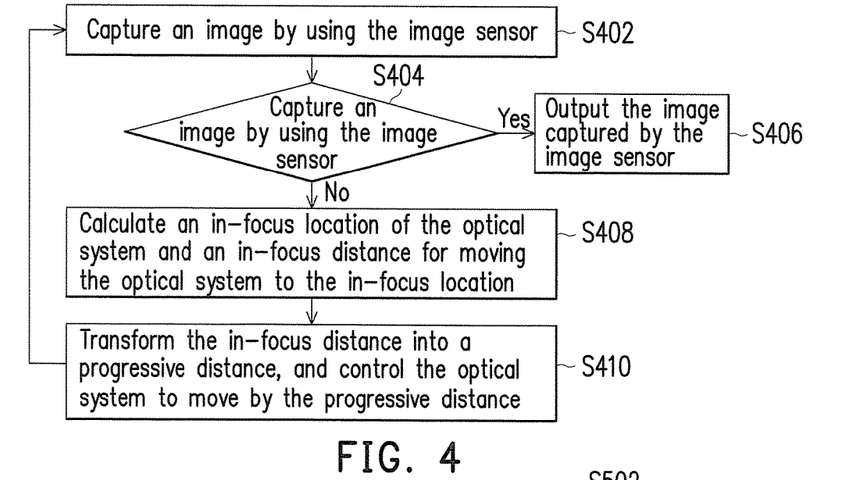
FIG. 4 is a flowchart illustrating a progressive auto-focus method of an image pick-up apparatus according to an embodiment of the invention.

In detail, FIG. 4 is a flowchart illustrating a progressive auto-focus method of an image pick-up apparatus according to an embodiment of the invention. Referring to FIG. 3 and FIG. 4, the progressive auto-focus method of the present embodiment is adapted to the image pick-up apparatus 30 of FIG. 3, and detailed steps of the progressive auto-focus method of the present embodiment are described below with reference of various components of the image pick-up apparatus 30 of FIG. 3.

First, an image is captured by using the image sensor 34 (step S402). The image pick-up apparatus 30, for example, activates a live view mode to capture the image after the user activates a camera function. The captured image is displayed on a display (not shown) of the image pick-up apparatus 30 in real-time for the user to view.

Then, the focus circuit 36 determines whether the optical system 32 is in focus when the image sensor 34 captures the image (step S404), where the focus circuit 36 is, for example, a phase detection circuit, and is adapted to receive the image signals captured by the focus detection pixels in the image sensor 34 when the image sensor 34 captures the image, and calculate a phase difference between the image signals captured by each pair of the focus detection pixels, so as to determine whether the optical system 32 is in focus when the image sensor 34 captures the image.

If the focus circuit 36 determines that the optical system 32 is in focus, the focus circuit 36 outputs the image captured by the image sensor 34 (step S406). Conversely, if the focus circuit 36 determines that the optical system 32 is out of focus, the focus circuit 36 calculates an in-focus location of the optical system 32 and an in-focus distance for moving the optical system 32 to the in-focus location (step S408). The focus circuit 36, for example, calculates the in-focus location of the optical system 32 and the in-focus distance for moving the optical system 32 to the in-focus location by using the phase detection circuit based on the calculated phase difference between the image signals captured by the focus detection pixels.

Then, the lens control circuit 38 transforms the in-focus distance calculated by the focus circuit 36 into a shorter progressive distance, and controls the optical system to move by the progressive distance (step S410). In an embodiment, the progressive distance is, for example, obtained by inquiring a predetermined transform table by the lens control circuit 38, where in the predetermined transform table, the in-focus distance is divided into a plurality of segments according to a value range, and the proper progressive distance corresponding to each of the segments is preset. In this way, each time when the lens control circuit 38 receives the in-focus distance calculated by the focus circuit 36, the lens control circuit 38 may inquire the transform table to obtain the transformed progressive distance.

For example, Table 1 (as shown below) is an example of the transform table of the in-focus distances and the progressive distances, and a relationship between the in-focus distance and the progressive distance in the table is, for example, a result of a plurality of different combinations of the in-focus distances and the progressive distances capable of providing good focus efficiency and good visual effect that is obtained through multiple tests. The transform table is, for example, pre-stored in the image pick-up apparatus 30, and the lens control circuit 38 may inquire the transform table at any time to obtain the progressive distance used for moving the lens of the optical system 32. Referring to Table 1, if the in-focus distance D calculated by the focus circuit 36 is 90 voice coil motor (VCM) steps, by inquiring Table 1, it is known that the transformed progressive distance is 60 VCM steps; and if the in-focus distance D calculated by the focus circuit 36 is 55 VCM steps, by inquiring Table 1, it is known that the transformed progressive distance is 20 VCM steps.

TABLE 1

| Referential No. | 1 | 2 | 3 |
|---|---|---|---|
| In-focus distance (steps) | 100 ≥ D > 80 | 80 ≥ D > 60 | 60 ≥ D > 40 |
| Progressive distance (steps) | 50 | 30 | 20 |

After the optical system 32 is moved, the flow returns to the step S402, and the image sensor 34 is continually used to capture an image, the steps S404-S410 are repeated, and the image captured by the image sensor 34 is output until the focus circuit 36 determines that the optical system 32 is in focus (step S406).

According to the aforementioned method, the image pick-up apparatus 30 may progressively move the lens of the optical system 32 to the in-focus location without decreasing a focus speed due to back and forth movement of the lens caused by a change of a focal point. The image captured by the image sensor 34 during the focus process is displayed on the display (not shown) of the image pick-up apparatus 30 to provide the user a smooth viewing experience.

It should be noted that in the aforementioned embodiment, the image pick-up apparatus 30 may repeatedly capture images, and calculate the progressive distance to move the optical system 32, and outputs the image captured by the image sensor 34 until the focus circuit 36 determines that the optical system 32 is in focus. However, in another embodiment, the image pick-up apparatus 30 further determines whether the calculated in-focus distance is smaller than or equal to a predetermined minimum distance, so as to determine whether to directly adopt the in-focus distance to move the optical system 32 without transforming the same into the progressive distance.

Figure 5:
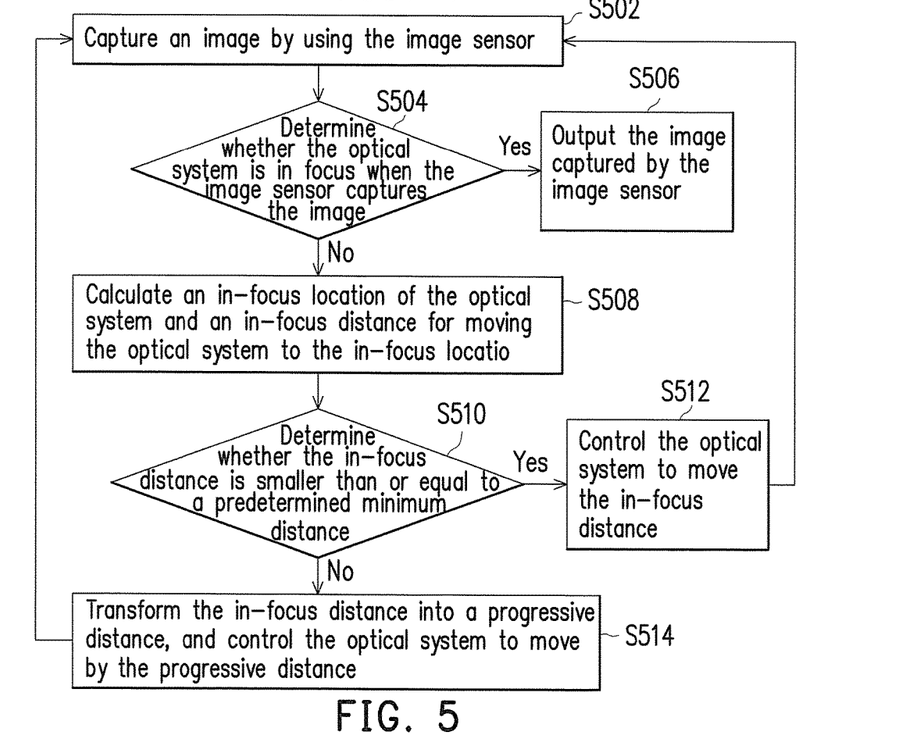
FIG. 5 is a flowchart illustrating a progressive auto-focus method of an image pick-up apparatus according to an embodiment of the invention.

In detail, FIG. 5 is a flowchart illustrating a progressive auto-focus method of an image pick-up apparatus according to an embodiment of the invention. Referring to FIG. 3 and FIG. 5, the progressive auto-focus method of the present embodiment is adapted to the image pick-up apparatus 30 of FIG. 3, and detailed steps of the progressive auto-focus method of the present embodiment are described below with reference of various components of the image pick-up apparatus 30 of FIG. 3.

First, an image is captured by using the image sensor 34 (step S502). Then, the focus circuit 36 determines whether the optical system 32 is in focus when the image sensor 34 captures the image (step S504). If the focus circuit 36 determines that the optical system 32 is in focus, the focus circuit 36 outputs the image captured by the image sensor 34 (step S506). Conversely, if the focus circuit 36 determines that the optical system 32 is out of focus, the focus circuit 36 calculates an in-focus location of the optical system 32 and an in-focus distance for moving the optical system 32 to the in-focus location (step S508). Implementations of the aforementioned steps S502-S508 are the same as or similar to those of the steps S402-S408 of the aforementioned embodiment, so that details thereof are not repeated.

Different from the aforementioned embodiment, in the present embodiment, after the focus circuit 36 calculates the in-focus distance for moving the optical system 32 to the in-focus location, the focus circuit 36 additionally determines whether the calculated in-focus distance is smaller than or equal to a predetermined minimum distance (step S510). If the focus circuit 36 determines that the calculated in-focus distance is smaller than or equal to the predetermined minimum distance, the lens control circuit 38 directly control the optical system 32 to move by the in-focus distance without transforming the in-focus distance into the progressive distance (step S512). After the movement of the optical system 32, the flow returns to the step S602 to continually capture an image by using the image sensor 34, and repeatedly execute the focus operation.

It should be noted that as the lens control circuit 38 progressively moves the optical system 32 to the in-focus location, the in-focus distances calculated by the focus circuit 36 becomes shorter and shorter, and when the in-focus distance is short to a certain degree, to transform the in-focus distance into the shorter progressive distance may prolong a focus time of the optical system 32. Therefore, in the present embodiment, a minimum distance for moving the optical system 32 is set, and when the in-focus distance is smaller than the minimum distance, the lens control circuit 38 directly moves the optical system 32 according to the in-focus distance without transforming the in-focus distance into the progressive distance. In this way, the focus time can be convergent to a certain time range to avoid influencing the focus speed due to excessive movement of the optical system 32.

Referring back to the step S510, if the focus circuit 36 determines that the in-focus distance is not smaller than or equal to the predetermined minimum distance, the lens control circuit of the image pick-up apparatus 30 may transform the in-focus distance calculated by the focus circuit 36 into a shorter progressive distance, and control the optical system 32 to move by the progressive distance (step S514).

After the movement of the optical system 32, the flow returns to the step S502 to continually capture an image by using the image sensor 34, and repeat the steps S504-S514 until the focus circuit 36 determines that the optical system 32 is in focus, and then the image captured by the image sensor 34 is output (step S506).

According to the above method, the image pick-up apparatus 30 of the present embodiment may progressively move the lens of the optical system 32 to the in-focus location without decreasing a focus speed due to back and forth movement of the lens caused by a change of the focal point.

It should be noted that regarding the transform table of the aforementioned embodiment, the invention also provides a real-time feedback mechanism, which is adapted to adjust a value of the progressive distance in the transform table according to a variation of a photographing environment, so as to achieve a better focus effect.

Figure 6:
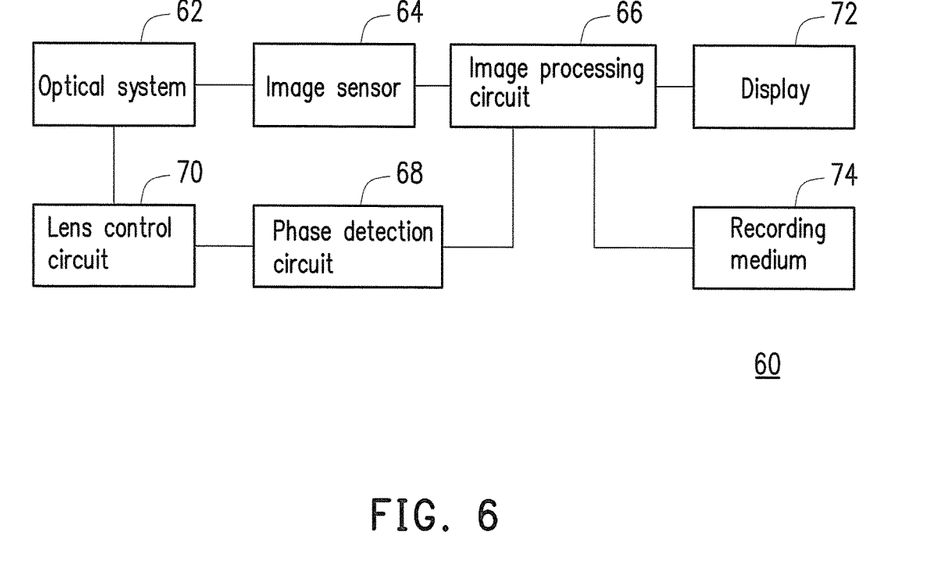
FIG. 6 is a block diagram of an image pick-up apparatus according to an embodiment of the invention.

In detail, FIG. 6 is a block diagram of an image pick-up apparatus according to an embodiment of the invention. Referring to FIG. 6, the image pick-up apparatus 60 of the present embodiment is, for example, a digital camera, a digital video camcorder (DVC), or a camera equipped on an electronic device, and includes an optical system 62, an image sensor 64, an image processing circuit 66, a phase detection circuit 68, a lens control circuit 70, a display 72 and a recording medium 74. Types and functions of the optical system 62, the image sensor 64 and the lens control circuit 70 are the same as or similar to that of the optical system 32, the image sensor 34 and the lens control circuit 38 of the aforementioned embodiment, so that details thereof are not repeated.

Different from the aforementioned embodiment, the image pick-up apparatus 60 of the present embodiment further includes the image processing circuit 66, the phase detection circuit 68, the display 72 and the recording medium 74. The image processing circuit 66 and the phase detection circuit 68 can be implemented by integrated circuits or microprocessors. The image processing circuit 66 can be configured to execute a specific image processing function, and the phase detection circuit 68 can be configured to receive the image signals captured by the focus detection pixels in the image sensor 64 when the image sensor 64 captures the image, and calculate a phase difference between the image signals captured by each pair of the focus detection pixels, so as to determine whether the optical system 62 is in focus when the image sensor 64 captures the image. The display 72 is, for example, a liquid crystal display (LCD) or a light-emitting diode (LED), which can be configured to display the image captured by the image sensor 64. The recording medium 74 is, for example, a device having a data storage function such as a hard disk or a memory, which can be used for storing the image captured by the image sensor 64.

Figure 7:
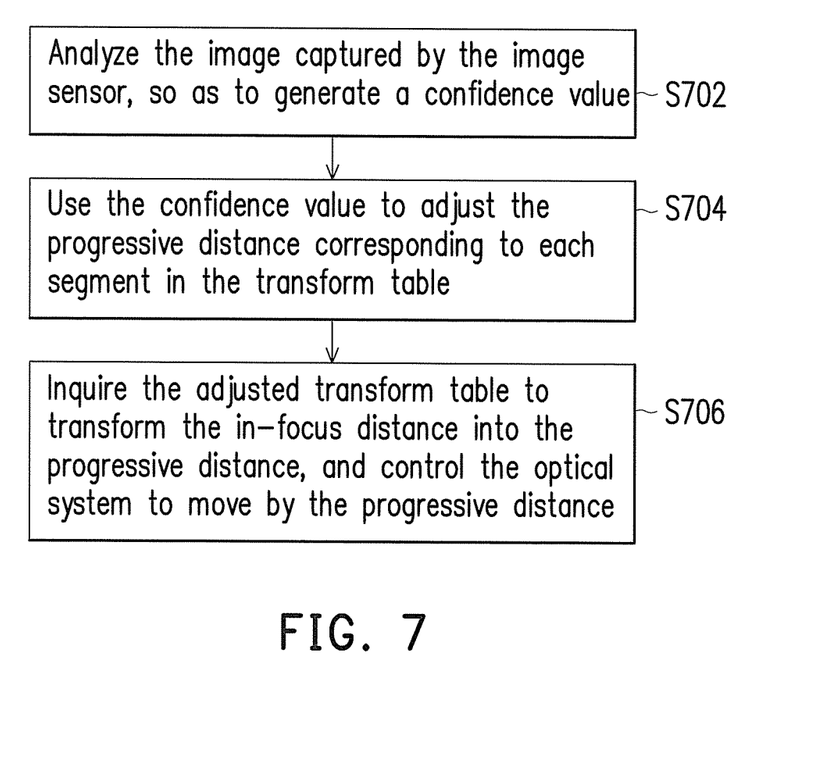
FIG. 7 is a flowchart illustrating a progressive auto-focus method of an image pick-up apparatus according to an embodiment of the invention.

FIG. 7 is a flowchart illustrating a progressive auto-focus method of an image pick-up apparatus according to an embodiment of the invention. Referring to FIG. 6 and FIG. 7, the progressive auto-focus method of the present embodiment is adapted to the image pick-up apparatus 60 of FIG. 6, and is an extending implementation of the step S410 in FIG. 4.

In detail, in the progressive auto-focus method of the present embodiment, after the image pick-up apparatus 60 uses the image sensor 64 to capture the image, while the phase detection circuit 68 calculates the in-focus location of the optical system 62, the image processing circuit 66 analyses the image captured by the image sensor 64, so as to generate a confidence value (step S702). The aforementioned analysis may include blur, noise, or color depth in the image. The higher confidence value represents higher reliability of the phase detection result, and the lower confidence value represents lower reliability of the phase detection result.

Therefore, the image processing circuit 66 may use the generated confidence value to adjust the progressive distance corresponding to each segment in the transform table of in-focus distance and progressive distance (step S704), and finally the lens control circuit 70 inquires the adjusted transform table to transform the in-focus distance calculated by the phase detection circuit 68 into the progressive distance, and controls the optical system 62 to move by the progressive distance (step S706).

For example, Table 2 (as shown below) is an example of the transform table of in-focus distance and progressive distance. Referring to Table 1 and Table 2, segment ranges of the in-focus distances in Table 2 are the same as that of Table 1, though in Table 2, the confidence value obtained by analysing the captured image is further referred to adjust the progressive distance corresponding to each segment in Table 1. The progressive distance in each segment of Table 2 is, for example, a result obtained by multiplying the corresponding progressive distance in Table 1 by a proportion of the confidence value (i.e. 0.9). Compared to Table 1, the transformed progressive distances in Table 2 are shorter, which represents that the corresponding movement method thereof is relatively conservative. To deduce by analogy, if the confidence value of the image is lower, it represents that the image is probably too dark or too blur, and it has a high chance to misjudge the in-focus location, so that in the present embodiment, by decreasing the progressive distance, the influence caused by the aforementioned factors can be decreased. It should be noted that in the present embodiment, although the progressive distance of each segment in the transform table is proportionally adjusted according to the confidence value, the invention is not limited thereto, and those skilled in the art may use other equation to adjust the progressive distance according to an actual requirement.

TABLE 2

| Referential No. | 1 | 2 | 3 |
|---|---|---|---|
| In-focus distance (steps) | 100 ≥ D > 80 | 80 ≥ D > 60 | 60 ≥ D > 40 |
| Confidence value | 90 | 90 | 90 |
| Progressive distance (steps) | 45 | 27 | 18 |

In the aforementioned embodiment, the image pick-up apparatus uses the confidence value obtained by analysing the captured image to adjust the progress distances in the transform table, and in other embodiments, the image pick-up apparatus may also directly uses the confidence value to transform the progressive distance.

Figure 8:
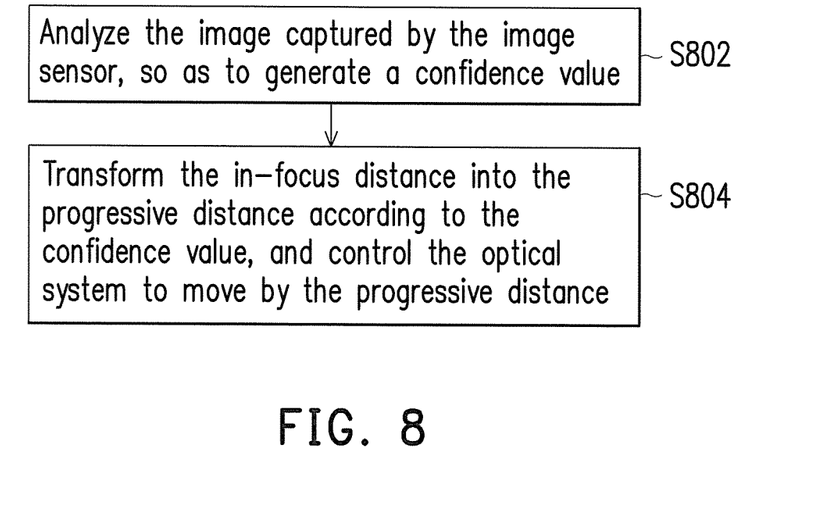
FIG. 8 is a flowchart illustrating a progressive auto-focus method of an image pick-up apparatus according to an embodiment of the invention.

In detail, FIG. 8 is a flowchart illustrating a progressive auto-focus method of an image pick-up apparatus according to an embodiment of the invention. Referring to FIG. 6 and FIG. 8, the progressive auto-focus method of the present embodiment is adapted to the image pick-up apparatus 60 of FIG. 6, and is an extending implementation of the step S410 in FIG. 4.

Similar to the flow of FIG. 7, in the progressive auto-focus method of the present embodiment, after the image pick-up apparatus 60 uses the image sensor 64 to capture the image, while the phase detection circuit 68 calculates the in-focus location of the optical system 62, the image processing circuit 66 analyses the image captured by the image sensor 64, so as to generate a confidence value (step S802). The aforementioned analysis may include blur, noise, or color depth in the image.

Different from the embodiment of FIG. 7, in the present embodiment, the lens control circuit 70 directly transforms the in-focus distance calculated by the phase detection circuit 68 into the progressive distance according to the confidence value, and controls the optical system 62 to move by the progressive distance (step S804). The lens control circuit 70, for example, adopts an equal proportion or other equation to transform the in-focus distance into the progressive distance according to the confidence value, and implementation thereof is not limited by the invention.

For example, Table 3 (as shown below) is an example of the transform table of in-focus distance and progressive distance, in which the progressive distance transformed from the in-focus distance 100 (steps) under difference confidence values are listed. If the calculated confidence value is 100, the progressive distance transformed from the in-focus distance 100 is 95; if the calculated confidence value is 80, the progressive distance transformed from the in-focus distance 100 is 70; and if the calculated confidence value is 70, the progressive distance transformed from the in-focus distance 100 is 60. The relationship between the in-focus distance and the progressive distance is, for example, obtained by multiplying the confidence value by a certain proportion or inputting the confidence value into a predetermined equation, which is not limited by the present embodiment.

TABLE 3

| Referential No. | 1 | 2 | 3 |
|---|---|---|---|
| In-focus distance (steps) | 100 | 100 | 100 |
| Confidence value | 100 | 80 | 70 |
| Progressive distance (steps) | 95 | 70 | 60 |

It should be noted that during the focus process, a location of the photographed object is probably changed, which causes a change of the in-focus location. In this case, the location of the photographed object is further predicted after the image is captured, and the in-focus location is accordingly modified, so as to avoid decreasing the focus speed due to the back and forth movement of the lens.

Figure 9:
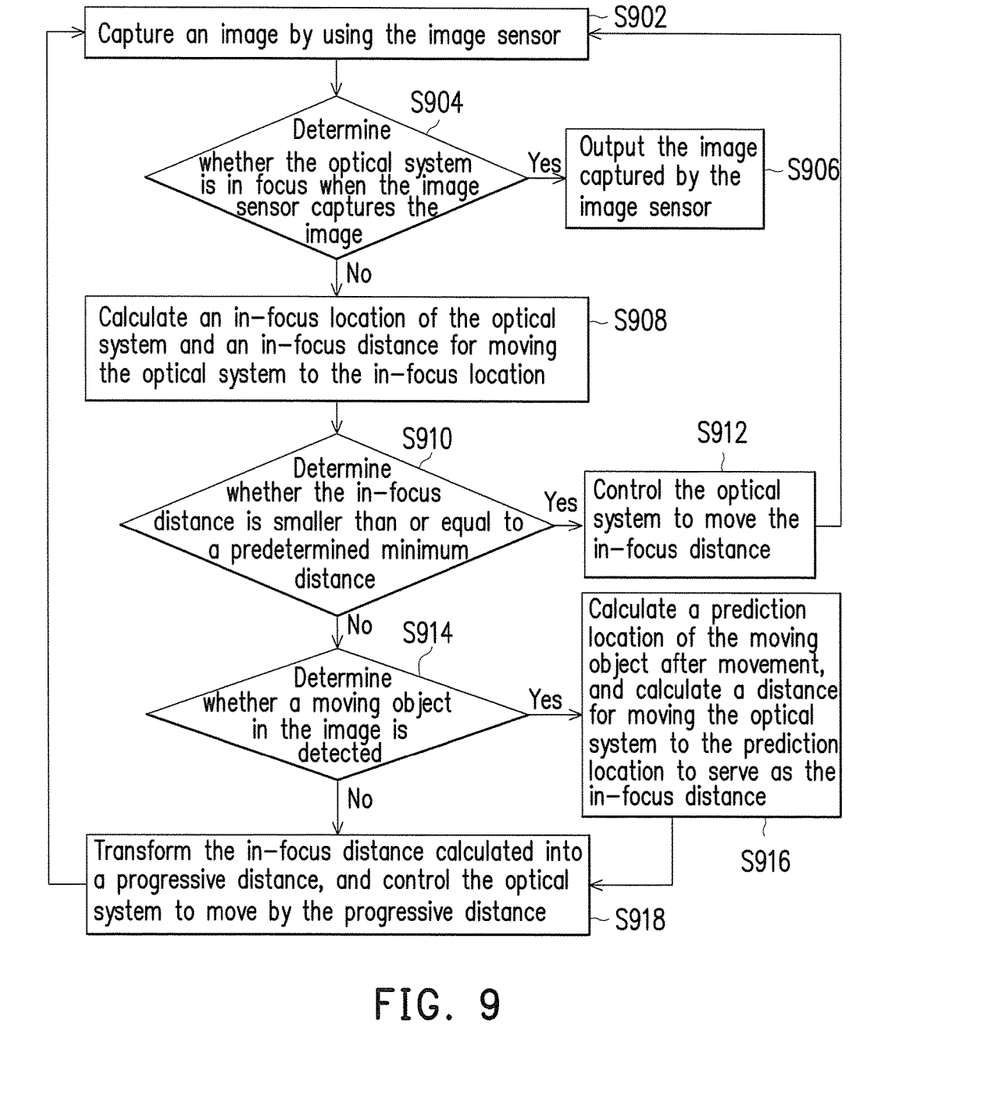
FIG. 9 is a flowchart illustrating a progressive auto-focus method of an image pick-up apparatus according to an embodiment of the invention.

In detail, FIG. 9 is a flowchart illustrating a progressive auto-focus method of an image pick-up apparatus according to an embodiment of the invention. Referring to FIG. 6 and FIG. 9, the progressive auto-focus method of the present embodiment is adapted to the image pick-up apparatus 60 of FIG. 6, and detail steps of the progressive auto-focus method of the present embodiment are described below with reference of various components of the image pick-up apparatus 60 of FIG. 6.

First, an image is captured by using the image sensor 64 (step S902), and the phase detection circuit 68 determines whether the optical system 62 is in focus when the image sensor 64 captures the image (step S904). If the phase detection circuit 68 determines that the optical system 62 is in focus, the phase detection circuit 68 outputs the image captured by the image sensor 64 (step S906). Conversely, if the phase detection circuit 68 determines that the optical system 62 is out of focus, the phase detection circuit 68 calculates the in-focus location of the optical system 62 and the in-focus distance for moving the optical system 62 to the in-focus location (step S908). Implementation methods of the aforementioned steps S902-S908 are the same as or similar to those of the steps S402-S408 of the aforementioned embodiment, so that details thereof are not repeated.

Different from the aforementioned embodiment, in the present embodiment, after the phase detection circuit 68 calculates the in-focus distance, the phase detection circuit 68 additionally determines whether the calculated in-focus distance is smaller than or equal to a predetermined minimum distance (step S910). If the phase detection circuit 68 determines that the in-focus distance is smaller than or equal to the predetermined minimum distance, the lens control circuit 70 directly controls the optical system 62 to move by the in-focus distance without transforming the in-focus distance into the progressive distance (step S912). After the optical system 62 is moved, the flow returns to the step S902, by which the image sensor 64 is continually used to capture an image, and the focus operation is repeated.

It should be noted that as the lens control circuit 70 progressively move the optical system 62 to the in-focus location, the in-focus distance calculated by the phase detection circuit 68 becomes shorter and shorter, and when the in-focus distance is short to a certain degree, to transform the in-focus distance into the shorter progressive distance may prolong a focus time of the optical system 62. Therefore, in the present embodiment, a minimum distance for moving the optical system 62 is set, and when the in-focus distance is smaller than the minimum distance, the lens control circuit 70 directly moves the optical system 32 according to the in-focus distance without transforming the in-focus distance into the progressive distance. In this way, the focus time can be convergent to a certain time range to avoid influencing the focus speed due to excessive movements of the optical system 62.

Referring back to the step S910, if the phase detection circuit 68 determines that the in-focus distance is not smaller than or equal to the predetermined minimum distance, the image pick-up apparatus 60 further determines whether a moving object in the image is detected (step S914). The image pick-up apparatus 60 of the present embodiment, for example, has a standard photographing mode and an object tracking mode, and may detect the moving object in the image by using a phase detection method or an image processing method, so as to switch between the standard photographing mode and the object tracking mode.

In detail, in an embodiment, the phase detection circuit 68 of the image pick-up apparatus 60 detects the moving object in the image based on the calculated phase difference. If the phase detection circuit 68 detects the moving object in the image, the phase detection circuit 68 calculates a prediction location of the moving object after movement, and calculates a distance for moving the optical system 62 to the prediction location to serve as the in-focus distance (step S916), and finally the lens control circuit 70 transforms the in-focus distance calculated by the phase detection circuit 68 into a shorter progressive distance, and controls the optical system 62 to move by the progressive distance (step S918).

In another embodiment, the image processing circuit 66 of the image pick-up apparatus 60 analyses the image captured by the image sensor 64 to detect the moving object in the image. The image processing circuit 66, for example, detects the moving object according to a color or brightness variation in the image, which is not limited by the invention. Similarly, if the image processing circuit 66 detects the moving object in the image, the image processing circuit 66 calculates a prediction location of the moving object after movement, and calculates a distance for moving the optical system 62 to the prediction location to serve as the in-focus distance (step S916), and finally the lens control circuit 70 transforms the in-focus distance calculated by the image processing circuit 66 into the shorter progressive distance, and controls the optical system 62 to move by the progressive distance (step S918).

It should be noted that in another embodiment, the image pick-up apparatus 60 may detect the moving object in the image according to a variation of the in-focus distance each time calculated by the phase detection circuit 68. For example, according to the aforementioned implementation method, the in-focus distance each time obtained by the phase detection circuit 68 executing the phase detection is progressively decreased theoretically. However, if the values of the in-focus distance obtained by successively executing the phase detection for multiple times are the same or close to each other, it represents that the focused object moves, and now the image pick-up apparatus 60 can be switched to the object tracking mode to calculate the in-focus distance according to the prediction location of the object after movement.

On the other hand, in the step S914, if the image pick-up apparatus 60 determines that the moving object in the image is not detected, the lens control circuit 70 may directly transform the in-focus distance previously calculated by the phase detection circuit 68 into a shorter progressive distance, and controls the optical system 62 to move by the progressive distance (step S918).

After the optical system 62 is moved, the flow returns to the step S902 to continually capture an image by using the image sensor 64, and the steps S904-S918 are repeated until the phase detection circuit 68 determines that the optical system 62 is in focus, and the image processing circuit 66 outputs the image captured by the image sensor 64 (step S906). The output image is, for example, stored in the recording medium 74 to facilitate accessing and viewing by the user at any time.

According to the above method, the image pick-up apparatus 60 of the present embodiment may progressively move the lens of the optical system 62 to the in-focus location after the photographed object is moved without decreasing a focus speed due to back and forth movement of the lens caused by a change of a focal point after the photographed object is moved.

In summary, in the image pick-up apparatus and the progressive auto-focus method thereof, by transforming the distance required for moving the lens to implement focusing into the shorter progressive distance to move the lens, the problem of back and forth movement of the lens probably caused by all-at-once movement is avoided. The invention further provides the object tracking mode, and the moving object is detected while the image is captured, and the location of the moving object after the movement is predicted to accordingly adjust the progressive distance used for moving the lens, so as to avoid the problem of back and forth movement of the lens caused by movement of the photographed object. In the invention, by progressively pushing the lens to the in-focus location through the progressive manner, even if the object is moved during the focus process, the image pick-up apparatus may have a quick response to avoid slowing down the focus speed due to back and forth movement of the lens and avoid influencing smoothness of the displayed image.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A progressive auto-focus method of an image pick-up apparatus, wherein the image pick-up apparatus comprises an optical system, an image sensor, a focus circuit and a lens control circuit, the progressive auto-focus method comprising:

capturing an image by using the image sensor;
   determining whether the optical system is in focus when the image sensor captures the image by the focus circuit;
   calculating an in-focus location of the optical system and an in-focus distance for moving the optical system to the in-focus location by the focus circuit if the optical system is out of focus;
   transforming the in-focus distance into a progressive distance by the lens control circuit, and controlling the optical system to move by the progressive distance, wherein the progressive distance is smaller than the in-focus distance, wherein the step of transforming the in-focus distance into the progressive distance by the lens control circuit comprises:
      inquiring a transform table by the lens control circuit to transform the in-focus distance into the progressive distance, wherein in the transform table, the in-focus distance is divided into a plurality of segments according to a value range, and the progressive distance corresponding to each of the segments is preset; and repeating the aforementioned steps until the optical system is in focus, and outputting the image captured by the image sensor.

2. The progressive auto-focus method as claimed in claim 1, wherein the image sensor comprises a plurality pairs of focus detection pixels, and the focus circuit comprises a phase detection circuit, and the step of calculating the in-focus location of the optical system and the in-focus distance for moving the optical system to the in-focus location by the focus circuit comprises:
 receiving a plurality of image signals captured by the focus detection pixels when the image sensor captures the image by using the phase detection circuit; and
 calculating a phase difference between the image signals captured by each pair of the focus detection pixels by the phase detection circuit, and calculating the in-focus location of the optical system and the in-focus distance for moving the optical system to the in-focus location according to the calculated phase difference.

3. The progressive auto-focus method as claimed in claim 2, wherein the step of determining whether the optical system is in focus when the image sensor captures the image by the focus circuit comprises:
 determining whether the optical system is in focus when the image sensor captures the image by the phase detection circuit based on the calculated phase difference.

4. The progressive auto-focus method as claimed in claim 2, further comprising:
 detecting a moving object in the image by the phase detection circuit based on the calculated phase difference; and
 calculating a prediction location of the moving object after movement and calculating a distance for moving the optical system to the prediction location to serve as the in-focus distance by the phase detection circuit if the moving object is detected.

5. The progressive auto-focus method as claimed in claim 1, wherein the image pick-up apparatus further comprises an image processing circuit, and the progressive auto-focus method further comprises:
 analysing the image captured by the image sensor by the image processing circuit to detect a moving object in the image; and
 calculating a prediction location of the moving object after movement and calculating a distance for moving the optical system to the prediction location to serve as the in-focus distance by the image processing circuit if the moving object is detected.

6. The progressive auto-focus method as claimed in claim 1, wherein the image pick-up apparatus further comprises an image processing circuit, and the progressive auto-focus method further comprises:
 analysing the image captured by the image sensor by the image processing circuit to generate a confidence value, and adjusting the progressive distance corresponding to each of the segments in the transform table according to the confidence value.

7. The progressive auto-focus method as claimed in claim 1, wherein the image pick-up apparatus further comprises an image processing circuit, and the progressive auto-focus method further comprises:
 analysing the image captured by the image sensor by the image processing circuit to generate a confidence value; and
 transforming the in-focus distance into the progressive distance by the lens control circuit according to the confidence value.

8. The progressive auto-focus method as claimed in claim 1, wherein after the step of calculating the in-focus location of the optical system and the in-focus distance for moving the optical system to the in-focus location by the focus circuit, the progressive auto-focus method further comprises:
 determining whether the in-focus distance is smaller than or equal to a predetermined minimum distance by the focus circuit;
 transforming the in-focus distance into the progressive distance by the lens control circuit and controlling the optical system to move by the progressive distance by the lens control circuit if the in-focus distance is not smaller than or equal to the predetermined minimum distance; and
 directly controlling the optical system to move by the progressive distance by the lens control circuit if the in-focus distance is smaller than or equal to the predetermined minimum distance.

9. An image pick-up apparatus, comprising:
 an optical system;
 an image sensor, coupled to the optical system, capturing an image;
 a focus circuit, coupled to the image sensor, determining whether the optical system is in focus when the image sensor captures the image, and calculating an in-focus location of the optical system and an in-focus distance for moving the optical system to the in-focus location when the optical system is out of focus, wherein the lens control circuit inquires a transform table to transform the in-focus distance into the progressive distance, and wherein in the transform table, the in-focus distance is divided into a plurality of segments according to a value range, and the progressive distance corresponding to each of the segments is preset; and
 a lens control circuit, coupled to the optical system and the focus circuit, transforming the in-focus distance calculated by the focus circuit into a progressive distance, and controlling the optical system to move by the progressive distance, wherein the progressive distance is smaller than the in-focus distance,
 wherein when the focus circuit determines that the optical system is in focus, the focus circuit outputs the image captured by the image sensor.

10. The image pick-up apparatus as claimed in claim 9, wherein the image sensor comprises a plurality pairs of focus detection pixels, and the focus circuit comprises:
 a phase detection circuit, receiving a plurality of image signals captured by the focus detection pixels when the image sensor captures the image, calculating a phase difference between the image signals captured by each pair of the focus detection pixels, and calculating the in-focus location of the optical system and the in-focus distance for moving the optical system to the in-focus location according to the calculated phase difference.

11. The image pick-up apparatus as claimed in claim 10, wherein the phase detection circuit determines whether the optical system is in focus when the image sensor captures the image based on the calculated phase difference.

12. The image pick-up apparatus as claimed in claim 10, wherein the phase detection circuit detects a moving object in the image based on the calculated phase difference, and calculates a prediction location of the moving object after movement when the moving object is detected, and calculates a distance for moving the optical system to the prediction location to serve as the in-focus distance.

13. The image pick-up apparatus as claimed in claim 10, further comprising:
an image processing circuit, analysing the image captured by the image sensor to detect a moving object in the image, calculating a prediction location of the moving object after movement when the moving object is detected, and calculating a distance for moving the optical system to the prediction location to serve as the in-focus distance.

14. The image pick-up apparatus as claimed in claim 10, further comprising:
an image processing circuit, analysing the image captured by the image sensor to generate a confidence value, and adjusting the progressive distance corresponding to each of the segments in the transform table according to the confidence value.

15. The image pick-up apparatus as claimed in claim 10, further comprising:
an image processing circuit, analysing the image captured by the image sensor to generate a confidence value, wherein the lens control circuit transforms the in-focus distance into the progressive distance according to the confidence value.

16. The image pick-up apparatus as claimed in claim 10, wherein the lens control circuit further determines whether the in-focus distance calculated by the focus circuit is smaller than or equal to a predetermined minimum distance, and transforms the in-focus distance into the progressive distance when the in-focus distance is not smaller than or equal to the predetermined minimum distance, and controls the optical system to move by the progressive distance, otherwise, the lens control circuit directly controls the optical system to move by the in-focus distance.

* * * * *